United States Patent
Miller et al.

(10) Patent No.: US 8,430,037 B2
(45) Date of Patent: Apr. 30, 2013

(54) MAGNETIC LEVITATION TRAIN

(75) Inventors: Luitpold Miller, Ottobrunn (DE);
Qinghua Zheng, Taufkirchen (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 268 days.

(21) Appl. No.: 12/741,564

(22) PCT Filed: Dec. 16, 2008

(86) PCT No.: PCT/DE2008/002077
§ 371 (c)(1),
(2), (4) Date: May 5, 2010

(87) PCT Pub. No.: WO2009/092341
PCT Pub. Date: Jul. 30, 2009

(65) Prior Publication Data
US 2010/0258027 A1 Oct. 14, 2010

(30) Foreign Application Priority Data
Jan. 22, 2008 (DE) .......................... 10 2008 005 888

(51) Int. Cl.
*B61B 13/04* (2006.01)
(52) U.S. Cl.
USPC ............ 104/118; 104/281; 104/286; 104/124
(58) Field of Classification Search ........... 104/281–286
See application file for complete search history.

(56) References Cited

U.S. PATENT DOCUMENTS

| | | | | |
|---|---|---|---|---|
| 4,698,895 A | * | 10/1987 | Miller et al. | 29/464 |
| 5,097,769 A | * | 3/1992 | Raschbichler et al. | 104/124 |
| 6,629,358 B2 | * | 10/2003 | Setiabudi et al. | 29/609 |
| 7,533,616 B2 | * | 5/2009 | Hahn et al. | 104/284 |
| 2004/0118315 A1 | * | 6/2004 | Reichel et al. | 104/118 |
| 2005/0115455 A1 | * | 6/2005 | Baumann | 104/281 |
| 2005/0201571 A1 | * | 9/2005 | Saint-Vincent et al. | 381/87 |
| 2010/0258027 A1 | * | 10/2010 | Miller et al. | 104/286 |
| 2011/0221223 A1 | * | 9/2011 | Mizata | 296/39.3 |
| 2012/0080262 A1 | * | 4/2012 | Soltau et al. | 181/294 |

FOREIGN PATENT DOCUMENTS

| | | |
|---|---|---|
| DE | 39 28 278 | 2/1991 |
| DE | 101 11 919 | 9/2002 |
| DE | 203 18 423 | 5/2005 |
| DE | 10 2004 056 438 | 10/2005 |
| WO | 97/30504 | 8/1997 |

* cited by examiner

*Primary Examiner* — Jason C Smith
(74) *Attorney, Agent, or Firm* — Michael J. Striker

(57) ABSTRACT

The invention relates to a magnetic levitation train, comprising a track system formed of track system carriers (2) and a vehicle (1) having at least one first magnetic system (7), which together with stator packs (4) mounted on the track system forms a long stator linear motor and during operation is disposed at a distance from the stator packs (4) by a small carrying gap. According to the invention, first sound damping bodies (14) are disposed on the carriers (2) in a space which is located between the carrier (2) and the magnetic system (7) and the carrying gap when a vehicle (1) passes. In addition, second sound damping bodies (15) are provided on the vehicle (1) on the side of the magnetic system (7) facing away from the carrier (2).

9 Claims, 2 Drawing Sheets

MAGNETIC LEVITATION TRAIN

Figure 1:
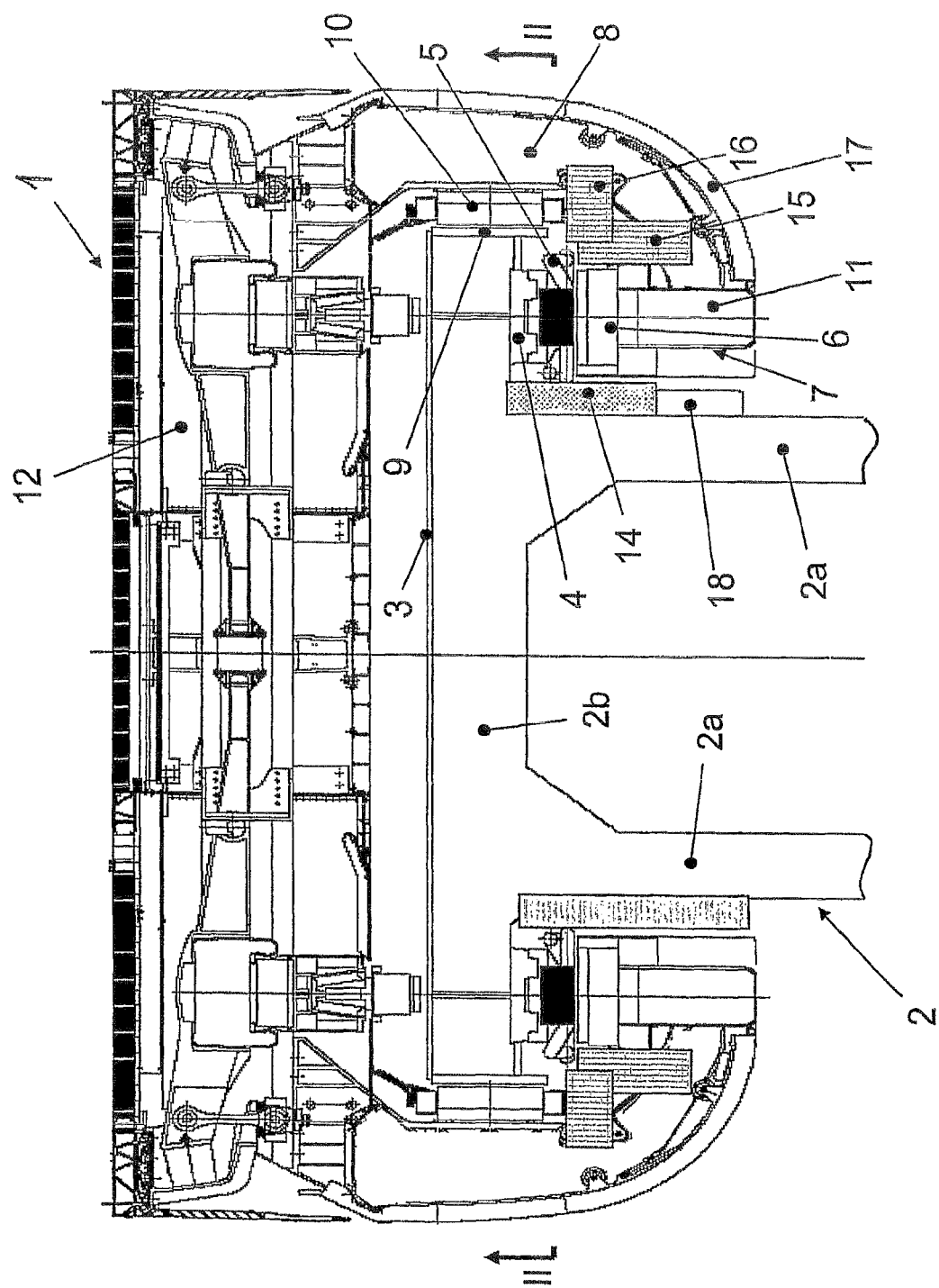

The present invention relates to a magnetically levitated railway of the type described in the preamble of claim 1.

To reduce the noises that are created during operation of a high-speed, magnetically levitated train (400 km/h and above), it is known to provide the track supports at various points with sheet-type sound-insulation elements that may be designed as sound absorbers, plate or cavity resonators, or the like (DE 101 11 919 A1). A design of the track supports of this type is based on the premise that noises that develop during operation of the vehicle are transferred to the track supports and, from there, are emitted into the environment. It is therefore assumed that covering the track supports with sheet-type sound-insulation elements in the form of foils or plates, which may be installed, if necessary, such that an air gap is formed in front of the particular support sections, may result in a considerable reduction in the sound emitted by the track supports. In fact, sound-insulation measures of this type are not particularly effective, even when the sound-insulation elements are installed on the upper and/or lower flanges and the lateral parts of the supports.

Sound-insulation measures that are likewise known and are designed to encapsulate the sound created in the support and guidance system of a magnetically levitated railway by minimizing the dimensions of the gaps between the vehicle and the supports, and designing the gaps as labyrinths (DE 203 18 423 U1) are also largely ineffective. A substantial damping of sound may not be attained in this manner even when the elements that bound the gap are manufactured of materials having sound-absorbing properties. In addition, in this design, there is a risk of ice forming in cold seasons, and therefore additional elements, such as heating wires or the like must be installed, which greatly increases the costs to manufacture and operate the magnetically levitated railway. Finally, components that are installed on the outer sides of the vehicles may increase the driving resistance and impair the appearance of the vehicles.

Proceeding therefrom, the present invention addresses the technical problem of designing the magnetically levitated railway of the type described initially such that transmission of the sound to the track is largely prevented, encapsulating the sound is rendered superfluous, and, as a result, propagation of sound into the surroundings of the magnetically levitated railway is reduced to a greater extent than ever before.

This problem is solved by the characterizing features of claim 1.

The present invention is based on the finding that the main cause of sound production is considered not so much to be the aerodynamics of the exterior region of the vehicles, but rather the interaction between the longitudinal stator and the magnet systems. In other words, the noise that is produced by a magnetically levitated train that is operated at high speeds appears to occur mainly in the space between the support and guidance magnets and the components assigned thereto on the supports, i.e., the stator cores and the lateral guide rails. If, according to the present invention, this space is therefore filled with preferably large-volume sound-damping bodies having high internal friction, then a large portion of the noise energy that is produced will be converted to heat and therefore absorbed before the sound waves reach the track supports or any escape gaps that may be present between these and the vehicle. The amount of noise emitted to the surroundings is therefore effectively reduced.

Further advantageous features of the present invention result from the dependent claims.

Figure 2:
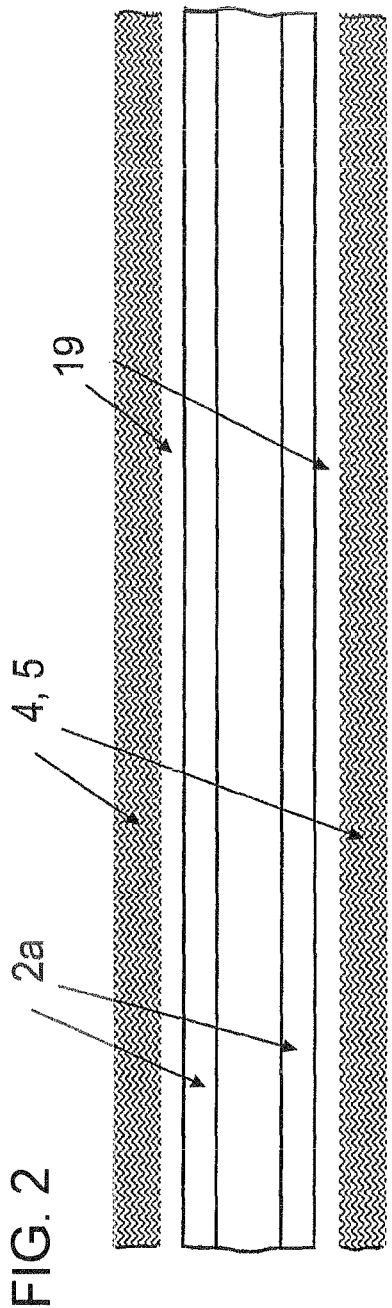
Figure 3:
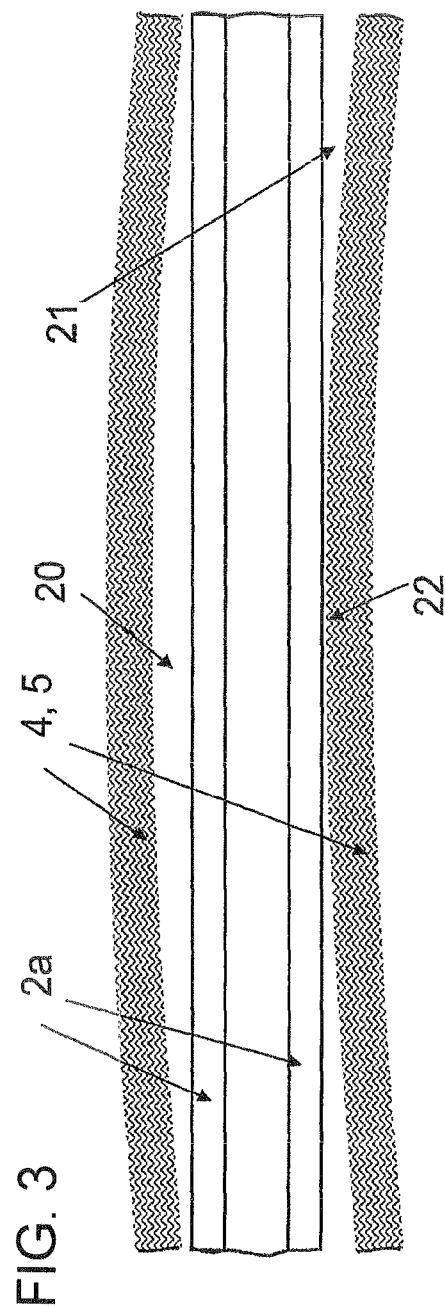

The present invention is explained below in greater detail with reference to the attached drawings of an embodiment. In the drawings:

FIG. 1 shows a schematic cross section through a typical magnetically levitated vehicle in the region of a frame strap and a track that is provided with a longitudinal stator, and FIGS. 2 and 3 show schematic cross sections through the track along the line II-II in FIG. 1, in an upper region that is located closely underneath stator cores, and in the absence of the vehicle.

FIG. 1 shows a schematic cross-sectional view through a magnetically levitated vehicle 1 which is drivably mounted, in a typical manner, on a track that extends in the longitudinal direction of a route, the track being composed of supports 2 made of steel and/or concrete, each of which includes, e.g., two lateral parts 2a and a top flange 2b connecting the two, on which track slabs 3 are mounted. Magnetically levitated vehicle 1 is driven via a longitudinal stator-linear motor which includes stator cores 4 which fastened to the underside of top flange 2b and outside of lateral parts 2a, and are situated one behind the other in the longitudinal direction of the longitudinal stator-linear motor. Stator cores 4 include teeth and slots, which are not shown in FIG. 1, are situated in alternation and into which windings 5 are inserted, windings 5 being supplied with alternating current having a variable amplitude and frequency. The actual excitation field of the longitudinal stator motor is generated by at least one first magnet system 7 that includes support magnets 6, is fastened to magnetically levitated vehicle 1 using at least one lateral frame strap 8, and includes magnetic poles that face the slots in stator cores 4, which open downward in FIG. 1. Magnet system 7 provides the excitation field and performs the functions of support and levitation by maintaining a predefined support gap of, e.g., 10 mm between support magnets 6 and stator cores 4 during operation of magnetically levitated vehicle 1.

To ensure that magnetically levitated vehicle 1 follows the track, lateral guide rails 9 are installed on the outer sides of top flange 2b, and are situated opposite at least one second magnet system 10, which is likewise mounted on frame straps 8 and acts as a guide magnet, and which is used, during operation, to maintain a guide gap, which corresponds to the support gap, between itself and guide rail 9.

Magnet systems 7 and 10 each form a module, which is fastened to frame straps 8, for the "support" and "guidance" functions. However, it is clear that a plurality of modules of this type may typically be installed on magnetically levitated vehicle 1 such that they are situated laterally adjacent to one another and one behind the other in the direction of travel.

Magnet system 7 for the "support" function contains magnetic poles that are situated one behind the other and include electrically series-connected windings and cores that are interconnected via pole backs, which are not shown, and are fastened to a magnet-back housing 11 of magnet system 7 using pole cheeks, which are likewise not shown, and rods which extend through the pole cheeks. Frame straps 8 (FIG. 1) engage in magnet-back housing 11 and are connected to a rigid undercarriage or levitation chassis 12 that includes longitudinal and transverse connectors, and on which a coach body of magnetically levitated vehicle 1 (FIG. 1), which is not depicted and is provided with a passenger compartment, is supported.

Magnet system 10 contains, in a corresponding manner, magnetic poles that are formed by cores and windings assigned thereto, and that abut a common plane that, in the embodiment, extends perpendicularly to the plane abutted by magnetic poles of magnet system 7.

Magnetically levitated vehicles 1 and their magnet systems are generally known to a person skilled in the art, e.g., from U.S. Pat. No. 4,698,895, DE 39 28 278 A1, DE 39 28 278 A1, PCT WO 97/30504 A1, and DE 10 2004 056 438 A1 which are hereby made the subject matter of the present disclosure via reference, for simplicity.

In terms of the noises that are produced during operation of the magnetically levitated train described herein, it is assumed that a region between slotted stator cores 4 and support magnets 6 situated opposite thereto must be considered to be a main source of noise. According to the present invention, it is therefore provided that this region be enclosed—to the greatest extent possible—by sound-damping bodies in order to attain effective sound damping even in the direct vicinity of the sound source.

To this end, first sound-damping bodies 14 are provided in a space that is located between first magnet system 7 and corresponding lateral part 2a of support 2 when a support 2 is passed by a vehicle 1, as shown in FIG. 1. First sound-damping bodies 14 are fastened to the outer sides of lateral parts 2a and extend, if possible, to their upper ends or to the corners formed by these upper ends and transversely extending top flanges 2b, and therefore fill the spaces that form between the outsides of lateral parts 2a and stator cores 4, including windings 5 and first magnet systems 7 when a vehicle 1 passes by, as shown clearly in FIG. 1.

To complete the sound insulation, second sound-damping bodies 15 are installed in vehicle 1. Sound-damping bodies 15 are located mainly on the outer side of first magnet system 7, which faces away from lateral parts 2a, and extend upward and downward as far as possible, i.e., as far as the spacial conditions in this region permit, in a manner such that they cover support magnets 6 and fill, to a sufficient extent, a part of magnet-back housing 11 located underneath.

Finally, in an embodiment that is considered at this time to be the best, third sound-damping bodies 16 are also provided, which are situated, in particular, in a space between the first and second magnet systems 6 and 10, respectively, and they preferably partially overlap the two sound-damping bodies 15 on their outer sides. Third sound-damping bodies 16 are preferably likewise accommodated in magnet-back housing 11.

Using second and third sound-damping bodies 15, 16, it is possible to cover the components, which abut the support gap, of the track and vehicle 1 on the side—which faces away from supports 2—of magnet system 7, and the components that abut the guide gap, toward the bottom. As a result, the entire sound source that is considered to be critical is covered either by sound-damping bodies 14, 15, and 16 according to the present invention, and/or by parts that are present anyway due to the design and likewise have an at least partial sound-damping effect.

To be effective, sound-damping bodies 14 through 16 are designed as voluminous and not merely sheet-type elements, and they are made of materials having high internal friction with respect to the sound waves that are generated. Within the scope of the present invention, "voluminous" is understood to mean that the thickness of sound-damping bodies 14 through 16, as measured in the direction of the sound propagation, should not fall below a certain minimum dimension that is, e.g., 8 cm, and thicknesses of 10 cm to 20 cm are considered at this time to be desirable. In addition, sound-damping bodies 14 through 16 should be designed, in the critical regions that abut magnet systems 7, 10, such that they fill the structurally usable volume in these regions to the extent necessary and/or possible. Due to the combination, according to the present invention, of voluminous sound-damping bodies 14 through 16 on supports 2 and in vehicle 1 with materials having high internal friction with respect to the sound waves that are produced, a large portion of the sound in sound-damping bodies 14 through 16 is converted to heat and is therefore effectively absorbed and eliminated.

For the rest, FIG. 1 shows that sound-damping bodies 15, 16 may be accommodated in magnet-back housings 11—which are present anyway, are largely hollow inside, and are supported by frame straps 8—and may be covered on the outside by typical cladding pieces 17. Therefore, they do not affect the overall visual appearance of vehicle 1 and/or support 2, nor do they affect the driving resistance of vehicle 1. FIG. 1 also shows that supports 2 may be provided with schematically indicated holders 18 for lines—at least on one side, which is the right side in this case—which are used for the inductive transmission of electrical energy from the track to vehicle 1 and interact with receive coils which are located in vehicle 1 and are not depicted. As shown in FIG. 1, first sound-damping bodies 14 are preferably located in the entire space that is available above holders 18.

Porous plastic and foamed materials are suitable, in particular, for use as materials for sound-damping bodies 14 through 16, and the internal friction may be optimized depending on the frequencies of the sound waves that are generated and that are present in specific cases and may be determined via measurement. It is also advantageous to use materials for sound-damping bodies 14 fastened to supports 2 that are weather-resistant and have a long service life. In addition, sound-damping bodies 14 may be composed of solid, heavy materials, if necessary, since their weight is less of an issue since they are fastened to supports 2. In contrast, sound-damping bodies 15 and 16 are preferably composed of materials having optimal damping and absorption properties, even if the service lives are reduced as a result. It is assumed that sound-damping bodies 15, 16 located in vehicle 1 may be replaced easily, as needed, during typical maintenance work, while replacing sound-damping bodies 14 along the entire track would be an extremely complex undertaking. Since sound-damping bodies 15 and 16 increase the vehicle weight, they should also be made of the most lightweight materials possible.

FIGS. 2 and 3 show, in a schematic cross section and in a view from below, respectively, the distances between lateral parts 2a of support 2 and stator cores 4 and windings 5, which are installed on both sides of the track in the embodiment. While the distances between lateral parts 2a and stator cores 4 are largely constant on a straight section of track (FIG. 2), in curved sections of the track (FIG. 3), the distances depend on the curve radii. This is a consequence of the fact that track supports 2 have a relatively long length, e.g., of approximately 9 m to 25 m, and are typically curved very little or not at all, lateral parts 2a of support 2 are designed as a polygon outline, and only the vehicle table of support 2 that encloses top flange 26 is designed in accordance with the radii of the route. As a result, open spaces of different sizes result, as viewed along the length of the supports; the differences increase as the curve radius decreases. According to the present invention it is provided that first sound-damping bodies 14 be installed only at those points on the track where sufficiently large open spaces 19 (FIG. 2) or 20, 21 (FIG. 3) are present between lateral parts 2a and stator cores 4/windings 5. At those points where the distances are very small and, therefore, open spaces 22 having a small width are produced, sound-damping bodies 14 are left out entirely, to advantage, since they would be ineffective at these points anyway due to their small thickness. As a result, supports 2, as viewed in the direction of travel, are preferably not provided with sound-damping bodies 14 continuously, but only in segments; this has only a slight negative effect on the sound-damping properties, however.

The present invention is not limited to the embodiment described, which could be modified in various manners. This applies, in particular, for the position and shape of second and third sound-damping bodies 15 and 16. As an alternative, they could be combined to form single-pieced bodies, and/or manufactured in entirety as single pieces. Further, in deviation from FIG. 1, it is not necessary to utilize all of the space that is available for first sound-damping bodies 14, if their thickness is sufficient to attain the level of sound absorption desired. In addition, it is advantageous in terms of limiting installation costs to provide first sound-damping bodies 14 only in those track sections where sound damping of the type described herein is actually desired or required. Furthermore, supports 2, which are described with reference to an embodiment, and drive and/or guidance elements 4, 5 and 7 or 9, 10, which are situated substantially symmetrically on either side of supports 2, may have different designs and/or be located only in a central part of the track. Accordingly, vehicle 1 could have a design in the regions containing magnet systems 6 and 10 that differs from that shown in FIG. 1. In all of the cases described herein, it must also be noted, of course, that first sound-damping bodies 14 should not be designed thicker than is possible with consideration for all feasible tolerances, in order to prevent contact from occurring between vehicle 1 and sound-damping bodies 14. In addition, it is clear that a plurality of first and second magnet systems 6, 10 is normally located one behind the other in a vehicle 1, and, in this case, all of these magnet systems advantageously have the design that is described above. Finally, it is understood that the features described may also be used in combinations other than those described and depicted herein.

What is claimed is:

1. A magnetically levitated railway comprising
a track that contains a plurality of supports (2) located one behind the other in a direction of travel, which supports (2) are provided with stator cores (4) on both sides,
at least one vehicle (1) that includes on both sides of support (2) at least one first magnet system (7) which at least one first magnet system (7), together with the corresponding stator cores (4), forms a longitudinal stator-linear motor, and that, during operation of the vehicle (1) on both sides of support (2), the at least one first magnet system (7) is situated at a distance from the stator cores (4) by a support gap in which the longitudinal stator-linear motor creates a state of levitation, and
first sound-damping elements that are installed on both sides of the supports (2) beneath a respective top flange 2(*b*),
wherein the first sound-damping elements are composed of voluminous sound-damping bodies (14) located on the supports (2) in a position that, when the vehicle (1) passes by the position, the sound-damping bodies (14) are within a space between the supports (2) and the first magnet system (7), and
wherein on both sides of the support (2) second sound-damping bodies (15) composed of voluminous sound-damping bodies (14) are installed on the vehicle (1) on the side of the at least one first magnet system (7) facing away from the supports (2).

2. The magnetically levitated railway as recited in claim 1, wherein the supports (2) are provided with lateral guide rails (9) that are located perpendicularly to the stator cores (4), the vehicle (1) includes at least one second magnet system (10) that interacts with the lateral guide rails (9) and, together therewith, forms a guide gap, and third sound-damping bodies (16) are located in a space underneath the second magnet system (10) and the guide gap.

3. The magnetically levitated railway as recited in claim 2, wherein the second and third sound-damping bodies (15, 16) are accommodated in magnet-back housings (11) that are supported by frame straps (8) of the vehicle (1).

4. The magnetically levitated railway as recited in claim 2, wherein the second and third sound-damping bodies (15, 16) are covered externally by cladding pieces (17).

5. The magnetically levitated railway as recited in claim 2, wherein the third sound-damping bodies (16) are located in a space between the first and second magnet system (7, 10).

6. The magnetically levitated railway as recited in claim 2, wherein the second and third sound-damping bodies (15, 16) fill the entire usable volume between the two magnet systems (7, 10).

7. The magnetically levitated railway as recited in claim 2, wherein the first, second and third sound-damping bodies (14, 15, 16) are composed of materials having high internal friction.

8. The magnetically levitated railway as recited in claim 1, wherein the first sound-damping bodies (14) extend into a space between the stator cores (4) and the supports (2).

9. The magnetically levitated railway as recited in claim 1, wherein, in curves of the track, the supports (2) are provided with first sound-damping bodies (14) only where sufficiently large open spaces (20, 21) exist between the supports (2) and the stator cores (4).

* * * * *